(12) United States Patent
Fukushima et al.

(10) Patent No.: US 6,497,261 B1
(45) Date of Patent: Dec. 24, 2002

(54) PNEUMATIC TIRE HAVING TREAD MADE OF FOAMED RUBBER COMPOSITION

(75) Inventors: Yasuo Fukushima, Kodaira (JP); Daisuke Nohara, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/497,640

(22) Filed: Feb. 3, 2000

(30) Foreign Application Priority Data

| Feb. 3, 1999 | (JP) | ............................................ 11-025925 |
| Jun. 30, 1999 | (JP) | ........................................ 11-184894 |
| Jan. 31, 2000 | (JP) | ....................................... 2000-021258 |

(51) Int. Cl.⁷ ............................. B60C 1/00; B60C 11/00
(52) U.S. Cl. .................................. 152/209.4; 152/209.7
(58) Field of Search ......................... 152/209.4, 209.7, 152/905; 521/99, 131, 142, 143, 146, 148, 150; 428/314.2, 314.8, 313.5

(56) References Cited

U.S. PATENT DOCUMENTS

| 3,235,519 | A | * | 2/1966 | Hunter |
| 3,903,157 | A |   | 9/1975 | Hunter |
| 4,001,368 | A | * | 1/1977 | Michizoe et al. |
| 4,211,676 | A | * | 7/1980 | Watabe et al. |
| 4,655,962 | A | * | 4/1987 | Rowland et al. |
| 5,147,477 | A | * | 9/1992 | Mouri et al. |
| 5,351,734 | A |   | 10/1994 | Mouri et al. |
| 5,776,991 | A | * | 7/1998 | Teratani |

FOREIGN PATENT DOCUMENTS

| CA | 2049784 | * | 3/1992 |
| EP | 0 734 886 A1 |   | 10/1996 |
| EP | 771836 | * | 5/1997 |
| EP | 826522 | * | 3/1998 |
| JP | 62-283001 A |   | 12/1987 |
| JP | 63-90403 A |   | 4/1988 |
| JP | 4-110212 | * | 4/1992 |
| JP | 11-80423 | * | 3/1999 |

\* cited by examiner

Primary Examiner—Steven D. Maki
(74) Attorney, Agent, or Firm—Sughrue Mion, PLLC

(57) ABSTRACT

This invention relates to a pneumatic tire comprising a tread at least a surface portion of which is made of a foamed rubber composition, the foamed rubber composition including closed cells formed by compounding a foaming agent and a foaming assistant which contains sodium benzenesulfinate or a combination of sodium benzenesulfinate and urea.

14 Claims, 4 Drawing Sheets

Circumferential direction of the tread

PNEUMATIC TIRE HAVING TREAD MADE OF FOAMED RUBBER COMPOSITION

BACKGROUND OF THE INVENTION

1. Field of the Invention

This invention relates to a pneumatic tire comprising a tread at least a surface of which is made of a foamed rubber composition, and particularly to an improved technique of forming closed cells.

2. Description of Related Art

There is a technique of using a foamed rubber in a tread rubber of a so-called studless tire so as to obtain good performances on icy roads such as a driving property, a steering property and the like, in running on snow and/or icy roads (see: JP-A-62-283001, JP-A-63-235921, JP-A-63-90403 etc.).

It is desirable that a wear resistance property and the performances on icy roads are more improved in the studless tire applied with the foamed rubber.

However, in a conventional technique of forming closed cells when a closed cell content is decreased in order to improve the wear resistance property, the performances on icy roads is lowered, on the contrary when the closed cell content is increased in order to improve the performances on icy roads, the wear resistance property is degraded.

In the conventional technique of forming the closed cells it is impossible to control closed cell content and closed cell size separately. And, when the closed cell content is decreased, the closed cell size simply becomes small and even though the wear resistance property is improved, the performances on icy roads is degraded. On the contrary when the closed cell content is increased, the closed cell size becomes large and the performances on icy roads is improved but the wear resistance property is degraded.

It is, therefore, an object of the invention to improve the wear resistance property and the performances on icy roads together.

SUMMARY OF THE INVENTION

In order to attain the object, the inventors have studied hard and developed a technique capable of controlling the closed cell content and the closed cell size separately and accomplished this invention.

Therefore, in the present invention only the closed cell size can be made large or small while the closed cell content is kept constant.

Concretely, a wear phenomenon is caused by the fact that cracks generated at the closed cells grow and conjugate one another. This can be solved by making a distance between closed cells larger and suppressing conjugation of cracks. That is, while the closed cell content is kept optimum, the closed cell size is made larger to decrease a density of a number of the closed cells and to make the distance between closed cells larger, so that the wear resistance property can be improved. On the other hand, it is necessary to increase the closed cell content in order to improve the performances on icy roads.

Further, in a heavy duty pneumatic tire it is more required that the wear resistance property is good, and in a pneumatic tire for a passenger car it is more required that the performances on icy roads is good.

Meantime, a vulcanization reaction and a foaming reaction simultaneously occur and a difference of their reaction rates influences the closed cell size. That is, when the formation of the cells by foaming proceeds faster than a formation of three-dimensional bond through vulcanization, the cell size becomes large, on the contrary when the vulcanization reaction proceeds faster than the formation of the cells, the cell size becomes small.

Since the foaming assistant used in the present invention accelerates the vulcanization reaction as well, the relative reaction rate between vulcanization reaction and the foaming reaction can be controlled by regulating a compounding amount of the foaming assistant based on the foaming agent amount, and hence the closed cell content and the closed cell size can be controlled separately by regulating the foaming agent amount and a ratio of the foaming assistant amount to the foaming agent amount.

According to an aspect of the invention, there is a provision of a pneumatic tire comprising a tread at least a ground contacting portion of which is made of a foamed rubber composition, which comprises matrix rubber comprising at least one rubber ingredient selected from the group consisting of natural rubber and synthetic rubbers and closed cells which is formed by compounding a foaming agent and a foaming assistant which comprises sodium benzenesulfinate or a combination of sodium benzenesulfinate and urea and being vulcanized.

In preferable embodiments of the invention, the foamed rubber composition further comprises short fibers which are solid and/or hollow and/or a filler, at least one part of the closed cells may be covered with a coat layer made from the short fiber material, the foaming agent contains azodicarbonamide, the compounding amount of the foaming agent is 1–20 parts by weight based on 100 parts by weight of the rubber ingredient and the foaming assistant is of 15–200% by weight based on the amount of the foaming agent compounded, a content of the closed cells is of 1–100%, or a mean size of the closed cells is of 30–200 $\mu$m. Further, the pneumatic tire is used for a passenger car and as the filler at least one selected from the group consisting of carbon black and silica is compounded in the foaming rubber composition in an amount of 30–80 parts by weight based on 100 parts by weight of the rubber ingredient, or the pneumatic tire is used as a heavy duty pneumatic tire and as the rubber ingredient comprises not less than 50% by weight of natural rubber and as the filler carbon black is compounded in an amount of 30–80 parts by weight based on 100 parts by weight of the rubber ingredient, in the foaming rubber composition.

Though the rubber tends to decrease in its hardness owing to the cells' existence, in case of including short fibers in the rubber matrix, the hardness of the rubber can be increased. In this case, the short fibers may be solid and/or hollow. When the short fibers are hollow, a hollow inside the fiber in addition to the cell formed by foaming effectively function on improvement of the performances on icy roads.

Further, when the fiber is made of a material which melts at any temperatures during vulcanization, since the gas formed through foaming reaction tends to gather at a melted fiber portion which is lower in viscosity than the rubber matrix portion, the cell becomes covered with the melted fiber material. In this case, when the fiber is hollow, the bigger closed cell may be formed by combining the gas formed through foaming reaction to the hollow inside the fiber (FIG. 3). On the other hand, when the fiber is a material which does not melt at any temperatures during vulcanization, the fiber maintains the form of the fiber even after the vulcanization (FIG. 4).

Moreover, the foaming agent preferably contains azodicarbonamide, and is compounded in an amount of 1–20 parts by weight based on 100 parts by weight of the rubber ingredient and the foaming assistant of 15–200% by weight based on the amount of foaming agent compounded.

Further, the content of the closed cells is preferably 1–100% even when hollow fibers are compounded. And the mean size of the closed cells in the rubber matrix without being covered with the fiber material is more preferably 30–200 µm. Cells those which have not been covered with the fiber material have a form of substantial sphere, while cells those covered with the fiber material has an elongated shape.

DESCRIPTION OF THE PREFERRED EMBODIMENTS

Figure 1:
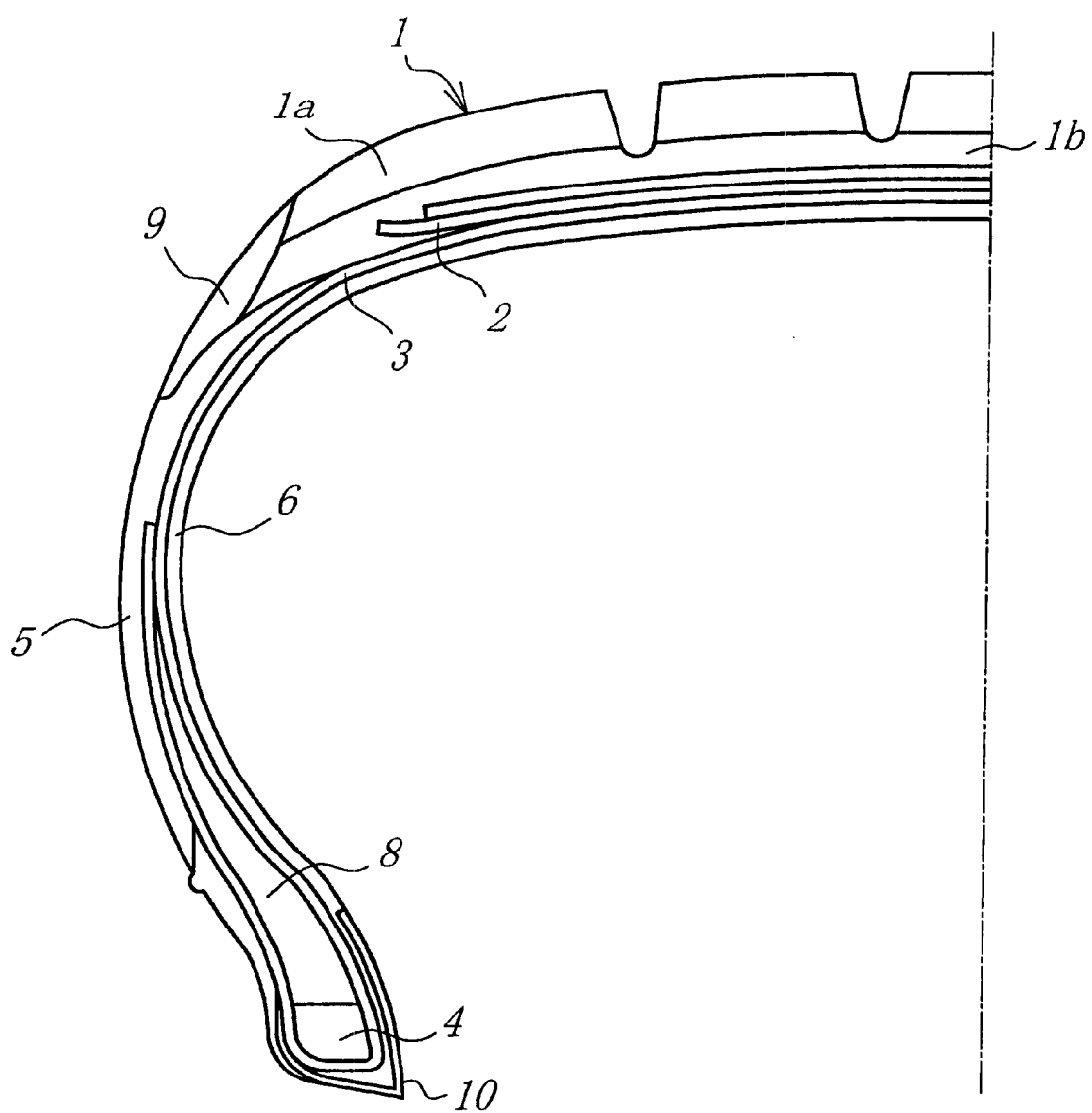
FIG. 1 is a left-half radial section view of the pneumatic tire for the passenger car.

As the rubber ingredient used in the present invention, mention may be made of diene rubbers such as natural rubber, isoprene rubber, high or low cis-butadiene rubber, emulsion polymerized or solution polymerized styrene-butadiene copolymer rubber and the like. They may be used alone or in combination.

In the present invention, in the foamed rubber composition applied to the heavy duty pneumatic tire, the rubber ingredient is preferably comprises not less than 50% by weight of natural rubber, while in one that applied to a pneumatic tire for passenger car the rubber ingredient preferably comprises not less than 50% by weight and more preferably not less than 80% by weight of a diene rubber.

As the foaming agent used in the present invention, mention may be made of azobisisobutyronitrile, dinitrosopentamethylenetetraamine (DPT), p-toluenesulfonyl-hydrazine, p,p'-oxybisbenzenesulfonylhydrazine, azodicarbonamide (ADCA) or the like. Among them, ADCA is preferable since it is a relatively safe reagent in use, excellently stable in standing and safe in an aspect of toxicity in a degree of being recognized as a food additive though a trace amount.

The foaming assistant used together with the foaming agent in the present invention is preferably sodium benzenesulfinate or sodium benzenesulfinate and urea.

The compounding amount of the foaming agent is preferably 1–20 parts by weight based on 100 parts by weight of the rubber ingredient. Because when it is less than 1 part by weight, it is difficult to foam and then the intended cell may not be formed, while when it exceeds 20 parts by weight, the cell content tends to become high and hence the wear resistance property of the pneumatic tire comprising the tread made of the rubber may be lowered. Form the same point of view, the compounding amount of the foaming agent is more preferably 3.5–8.5 parts by weight.

Besides, when hollow short fibers are compounded, since the hollow inside the fiber acts as a cell, the amount of the foaming agent can be made smaller.

The compounding amount of the foaming assistant containing sodium benzenesulfinate or the combination of sodium benzenesulfinate and urea is preferably 0.1–25 parts by weight based on 100 parts by weight of the rubber ingredient. Because when it is less than 0.1 parts by weight, it is difficult to obtain intended foam, while when it exceeds 25 parts by weight, the cell content tends to become high and hence the wear resistance property of the pneumatic tire may be lowered.

Further, the compounding amount of the foaming assistant is preferably of 15–200% by weight based on the foaming agent amount. Because when it is less than 15% by weight, it may not foam sufficiently, while when it exceeds 200% by weight, the foaming may start at a low temperature (about 100° C.) which may deteriorate the workability of the rubber composition.

As the material of the short fiber, mention may be made of a crystalline high-molecular compound such as polyethylene, polypropylene, polybutylene, polybutylene succinate, polyethylene succinate, syndiotactic-1,2-polybutadiene, poly(vinylalcohol), poly(vinyl chloride) or the like. Among them, polyethylene and polypropylene are preferable. Further, mention may be made of a non-crystalline high-molecular compound such as polymethylmetacrylate, acrylonitrile-butadiene-styrene terpolymer, polystyrene, polyacrylonitrile or the like. From a viewpoint of controlling during the production of a tire, the crystalline high-molecular compound is more preferable because of a rapid softening.

When it is required that the cells are gathered inside the short fiber melted during vulcanization, since it is necessary that the short fiber is not melted during kneading but melts during vulcanization, a melting point of the short fiber suitable for the use is higher by not less than 5° C., preferably not less than 10° C., and more preferably 20° C. than a maximum temperature during kneading, and lower by not less than 10° C., preferably not less than 20° C. than a maximum temperature during vulcanization.

A percentage of hollow in the hollow short fiber is preferably 20–70%. Because when it is low, its use effect may not be obtained sufficiently, while when it is high, it is easy to collapse. From the same point of view, it is more preferably 25–65%. Thickness of the hollow short fiber is preferably 1–1000 denier, and more preferably 2–800 denier from the viewpoint of improvement of the performances on icy roads. Its length is preferably 1–10 mm, and more preferably 2–8 mm. A compounding amount of the hollow short fibers is preferably 1–30 parts by weight based on 100 parts by weight of the rubber ingredient from the viewpoint of the performances on icy roads.

On the other hand, thickness of the solid short fiber is preferably 1–500 denier, its length is preferably 1–10 mm, and its compounding amount is preferably 0.5–20 parts by weight based on 100 parts by weight of the rubber ingredient.

In the present invention, the closed cell content of the foamed rubber composition is preferably 1–100% from the viewpoint of obtaining the performances on icy roads. Because when it is less than 1%, the effect of forming the closed cell or the effect of improving performances on icy roads is difficult to be obtained, while when it exceeds 100%, the wear resistance property tends to decrease, a restoring force against a strain in the foamed rubber lowers, a so-called resistance to permanent set in fatigue tends to lower, and it is difficult to obtain a stable form of the tire in manufacturing. From the same point of view, it is more preferably 5–50%, most preferably 5–35%.

Moreover, the mean size of the closed cells formed in the rubber matrix separating from the short fibers (spherical cells) is preferably 30–200 μm. Because when it is less than 30 μm, the performances on icy roads tends to lower, while when it exceeds 200 μm, the wear resistance property tends to be degraded. From the same point of view, it is more preferably 60–130 μm.

In the present invention, in case of compounding a filler such as carbon black, silica or the like in the foaming rubber composition, as a grade of carbon black, HAF, ISAF, or SAF is preferable for the pneumatic tire used in the passenger car, on the other hand, ISAF or SAF is preferable for the heavy duty pneumatic tire. The compounding amount of the filler is preferably 3–100 parts by weight based on 100 parts by weight of the rubber ingredient in both cases. Because when it is outside this range, the wear resistance property tends to decrease when the rubber composition is used in the tire tread.

Further, in the present invention, when the foaming rubber composition is used in the tread portion of the pneumatic tire having a multi-layer structure, it is preferable that the foaming rubber composition is applied to a surface layer of the tread portion contacting the road surface, and a hardness (JIS hardness) of an inside layer of the tread portion is higher than that of the surface layer. And a volume of the foamed rubber is effectively not less than 10% based on the whole volume of the tread portion, preferably 10–70%, and more preferably 40–60%. Because when it is less than 10%, the improving effect of the performances on icy roads is small.

Further, the foamed rubber composition used in the present invention may be compounded with additives for the rubber such as an aromatic oil, a softening agent, antioxidant, a vulcanization accelerator, stearic acid, accelerator activator such as zinc oxide, a crosslinking agent or the like in addition to the above-mentioned foaming agent, foaming assistant, filler such as carbon black, silica or the like.

The foamed rubber composition used in the present invention can be produced in a usual manner and the pneumatic tire according to the present invention can be manufactured by using the above-mentioned foaming rubber composition in the tread rubber and heating and pressuring according to a usual method of manufacturing the tire. In this case, by controlling the compounding amounts of the foaming agent and the foaming assistant the desired closed cell content and size can be obtained.

The present invention will be exampled concretely in accordance with the following examples.

Various foaming rubber compositions having a compounding recipe shown in Tables 1, 3 or 5 are produced and applied to a cap rubber of the tread portion to produce test tires in a usual manner (the temperature of kneading: 100° C. and the temperature of vulcanization: 160° C.). About each of the obtained test tires the closed cell content is calculated by using the following equation and the performances in an actual car mounted with the tire are evaluated according to methods mentioned below. The test tires in Tables 1–4 are radial tires for a passenger car (a tire size of 185/70R14, see FIG. 1) and mounted onto the passenger car with a displacement of 1600 cc. The results are shown in Tables 2 and 4. On the other hand, Tables 5 and 6 exhibit about heavy duty pneumatic radial tires (a tire size of 11R22.5, see FIG. 2). The results are shown in Table 6. Compounded short fibers which do not melt during vulcanization are made from polyester, have a thickness of 4.0 denier, a length of 3 mm, a melting point of 200° C. and are solid short fibers. While compounded short fibers which melt during vulcanization are made from polyethylene, have a thickness of 4.0 denier, a length of 3 mm and a melting point of 110° C. and are solid short fibers. The melting short fibers melt and encapsulate the cells during vulcanization.

Figure 2:
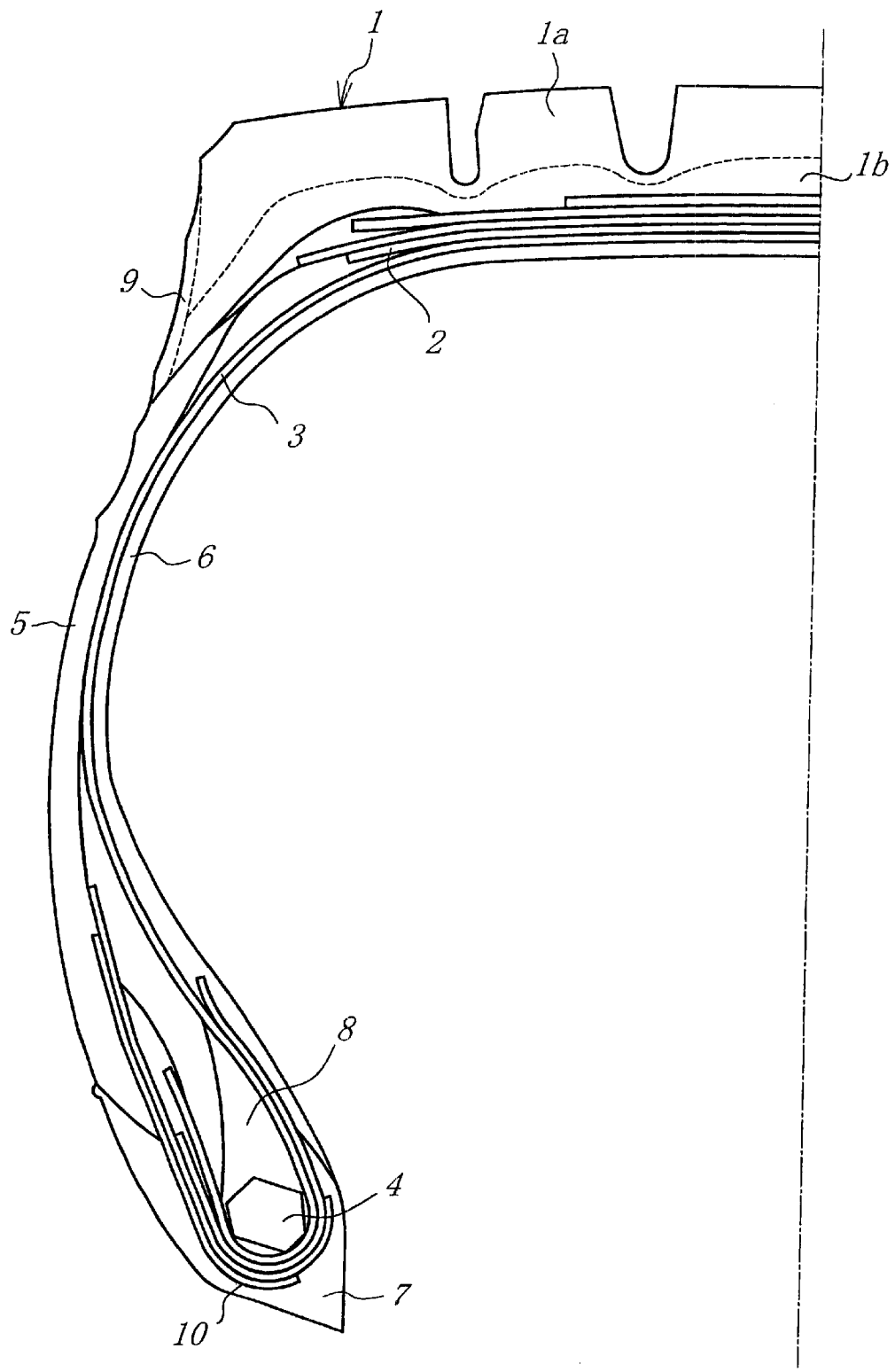
FIG. 2 is a left-half radial section view of the heavy duty pneumatic tire.

Further, in FIG. 1 and FIG. 2, a reference character 1 represents the tread portion, 1a a cap portion of the tread portion, 1b a base portion of the tread portion, 2 belts, 3 carcass plies, 4 a bead core, 5 a side wall, 6 an inner liner, 7 a bead, 8 a bead filler, 9 a mini-side and 10 a chafer.

Figure 3:
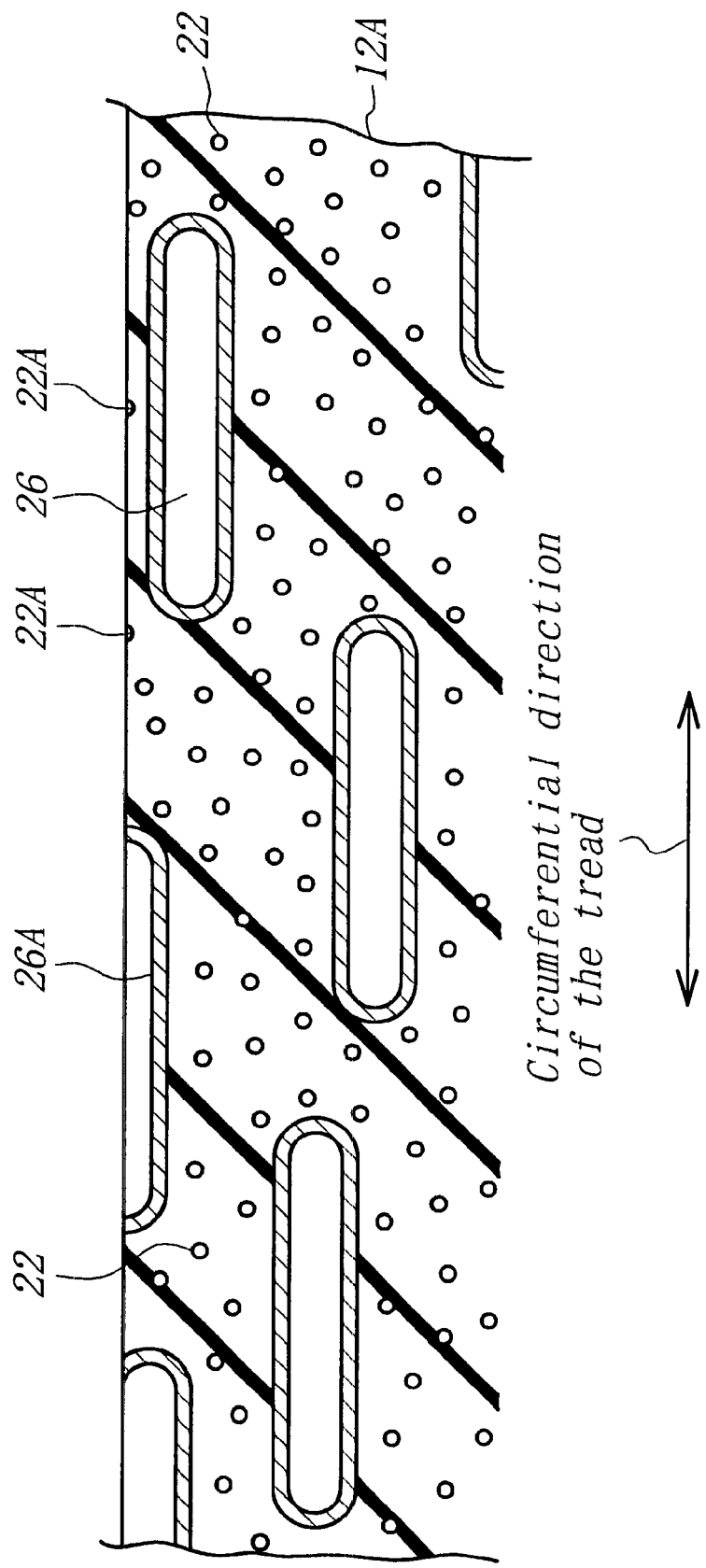
FIG. 3 is an enlarged cross sectional view of a worn cap portion containing spherical closed sells and elongated closed cell having a covering layer made of the fiber material.
Figure 4:
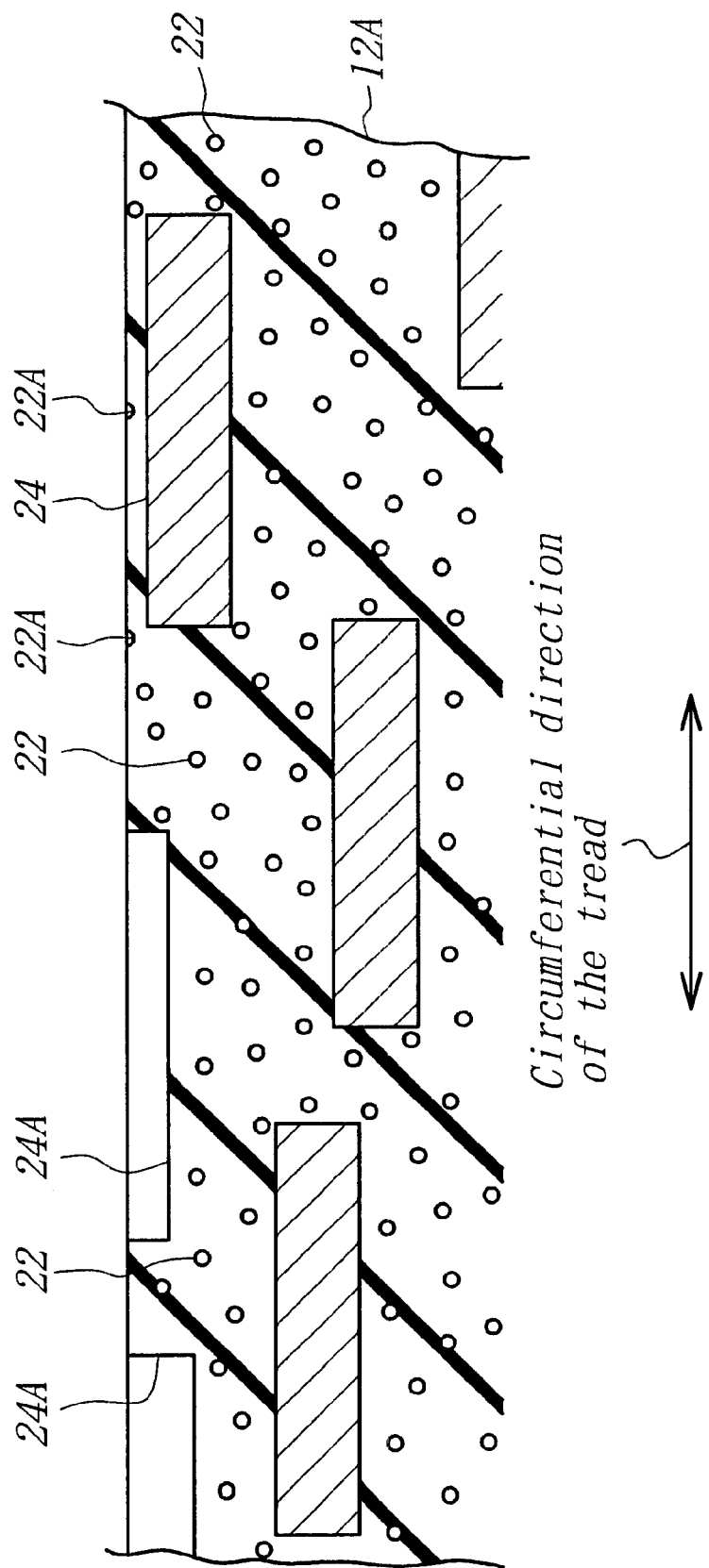
FIG. 4 is an enlarged cross sectional view of a worn cap portion containing spherical closed cells and short fibers.

In FIG. 3 and FIG. 4, a reference character 12A represents the foamed rubber in tread after vulcanization, 22 the spherical closed cells which are not covered with the fiber material, 22A the spherical closed cells which have come out to the surface of the tread and partly abraded, 24 the solid short fibers, 24A hollows after the short fibers have been removed, 26 the hollow short fibers, and 26A the covering layer.

Closed cell content:

$$V_S = \{(\rho_0/\rho_1) - 1\} \times 100$$

wherein $\rho_1$ is a density of the foamed rubber (g/cm$^3$), $\rho_0$ is a density of solid phase portion in the foamed rubber (g/cm$^3$).

Means Size of Spherical Closed Cells

A diameter of each of 20 closed cells in the foamed rubber is observed and measured by using a test glass and its mean value is calculated.

Wear Resistance Property

After running on a general-purpose road over 20,000 km a decrease in a groove depth is measured, and the wear resistance property is represented by a index of the reciprocal of the measured decrease on the basis that Comparative Example 1, 22 or Example 11 is 100, respectively. The larger the index value, the better the wear resistance property.

Performance on Icy Roads

The car mounted with the test tire is made to run on a test course (an icy road surface with a temperature of the surface of about −5° C.) and subjected to braking at a speed of 20 km/h to measure a distance required for stopping as a braking distance. The performance on icy roads is represented by an index of the reciprocal of the obtained braking distance on the basis that Comparative Example 1, 22, or Example 11 is 100, respectively. The larger the index value, the better the performance.

TABLE 1

(compounding unit: part by weight)

| | Example 1 | Example 2 | Comparative Example 1 | Comparative Example 2 | Comparative Example 3 | Example 3 | Example 4 | Example 5 | Example 6 | Example 7 | Example 8 | Comparative Example 4 | Comparative Example 5 | Comparative Example 6 | Comparative Example 7 |
|---|---|---|---|---|---|---|---|---|---|---|---|---|---|---|---|
| Natural rubber | 50 | 50 | 50 | 50 | 50 | 50 | 50 | 50 | 50 | 50 | 50 | 50 | 50 | 50 | 50 |
| Butadiene rubber | 50 | 50 | 50 | 50 | 50 | 50 | 50 | 50 | 50 | 50 | 50 | 50 | 50 | 50 | 50 |
| Carbon black (SAF) | 50 | 50 | 50 | 50 | 50 | 50 | 50 | 50 | 50 | 50 | 50 | 50 | 50 | 50 | 50 |
| Stearic acid | 3 | 3 | 3 | 3 | 3 | 3 | 3 | 3 | 3 | 3 | 3 | 3 | 3 | 3 | 3 |
| Zinc oxide | 3 | 3 | 3 | 3 | 3 | 3 | 3 | 3 | 3 | 3 | 3 | 3 | 3 | 3 | 3 |
| Wax | 1 | 1 | 1 | 1 | 1 | 1 | 1 | 1 | 1 | 1 | 1 | 1 | 1 | 1 | 1 |
| Antioxidant *1 | 1 | 1 | 1 | 1 | 1 | 1 | 1 | 1 | 1 | 1 | 1 | 1 | 1 | 1 | 1 |
| Antioxidant *2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| Vulcanization accelerator *3 | 1 | 1 | 1 | 1 | 1 | 1 | 1 | 1 | 1 | 1 | 1 | 1 | 1 | 1 | 1 |
| Sulfur | 1 | 1 | 1 | 1 | 1 | 1 | 1 | 1 | 1 | 1 | 1 | 1 | 1 | 1 | 1 |
| Foaming agent (azodicarbonamide) | 5 | 5 | 5 | 3.75 | 6.2 | 5 | 5 | 6 | 5 | 5 | 6 | 5 | 3.75 | 5 | 3.75 |
| Foaming assistant (sodium benzenesulfinate) | 2 | 0.5 | 0 | 0 | 0 | 2 | 0.5 | 1.5 | 2 | 0.5 | 1.5 | 0 | 0 | 0 | 0 |
| Foaming assistant (urea) | 0 | 1 | 3 | 2.25 | 3.75 | 0 | 1 | 0 | 0 | 1 | 0 | 3 | 2.25 | 3 | 2.25 |
| Non-melted short fibers | 0 | 0 | 0 | 0 | 0 | 4 | 4 | 4 | 0 | 0 | 0 | 4 | 4 | 0 | 0 |
| Melted short fibers | 0 | 0 | 0 | 0 | 0 | 0 | 0 | 0 | 2 | 2 | 2 | 0 | 0 | 2 | 2 |
| Content of closed cells (%) | 20 | 20 | 20 | 10 | 30 | 20 | 20 | 20 | 22 | 22 | 22 | 20 | 10 | 22 | 13 |
| Mean size of spheric closed cells ($\mu$m) | 80 | 90 | 150 | 50 | 200 | 80 | 90 | 110 | 70 | 80 | 100 | 150 | 50 | 160 | 60 |

*1: 6C, N-(1,3-dimethylbutyl)-N'-phenyl-p-phenylenediamine
*2: RD, 2,2,4-trimethyl-1,2-dihydroquinorine polymer
*3: CZ, N-cyclohexyl-2-benzothiazyl-sulfenamide

TABLE 2

|  | Example 1 | Example 2 | Comparative Example 1 | Comparative Example 2 | Comparative Example 3 | Example 3 | Example 4 | Example 5 | Example 6 | Example 7 |
|---|---|---|---|---|---|---|---|---|---|---|
| Wear resistance property | 104 | 103 | 100 | 113 | 87 | 107 | 107 | 108 | 106 | 106 |
| Performance on ice roads | 108 | 106 | 100 | 94 | 107 | 110 | 108 | 108 | 110 | 110 |

|  | Example 8 | Comparative Example 4 | Comparative Example 5 | Comparative Example 6 | Comparative Example 7 |
|---|---|---|---|---|---|
| Wear resistance property | 108 | 100 | 113 | 100 | 109 |
| Performance on ice roads | 109 | 103 | 95 | 105 | 80 |

Examples 1 and 2 have the same closed cell content as in Comparative Example 1, but the mean size of the closed cells are controlled. The pneumatic tire provided with such a tread can be improved in the wear resistance property and the performance on icy roads.

Examples 3, 4 and 5 are compounded with the non-melting short fibers and Examples 6, 7 and 8 are compounded with the melting short fibers, and also in these Examples the mean size of the closed cells care controlled while maintaining the closed cell content, and the tire performance can be improved.

TABLE 3

(compounding unit: part by weight)

|  | Example 11 | Example 12 | Example 13 | Example 14 | Example 15 | Example 16 | Example 17 | Comparative Example 11 | Comparative Example 12 | Comparative Example 13 |
|---|---|---|---|---|---|---|---|---|---|---|
| Natural rubber | 30 | 30 | 30 | 30 | 30 | 30 | 30 | 30 | 30 | 30 |
| Butadiene rubber | 70 | 70 | 70 | 70 | 70 | 70 | 70 | 70 | 70 | 70 |
| Carbon black (SAF) | 20 | 20 | 20 | 20 | 20 | 20 | 20 | 20 | 20 | 20 |
| Silica | 35 | 35 | 35 | 35 | 35 | 35 | 35 | 35 | 35 | 35 |
| Stearic acid | 3 | 3 | 3 | 3 | 3 | 3 | 3 | 3 | 3 | 3 |
| Zinc oxide | 3 | 3 | 3 | 3 | 3 | 3 | 3 | 3 | 3 | 3 |
| Wax | 1 | 1 | 1 | 1 | 1 | 1 | 1 | 1 | 1 | 1 |
| Antioxidant *1 | 1 | 1 | 1 | 1 | 1 | 1 | 1 | 1 | 1 | 1 |
| Anfloxidant *2 | 0.2 | 0.2 | 0.2 | 0.2 | 0.2 | 0.2 | 0.2 | 0.2 | 0.2 | 0.2 |
| Vulcanization accelerator *3 | 1 | 1 | 1 | 1 | 1 | 1 | 1 | 1 | 1 | 1 |
| Sulfur | 1 | 1 | 1 | 1 | 1 | 1 | 1 | 1 | 1 | 1 |
| Foaming agent (azodicarbonamide) | 3 | 4 | 4 | 5 | 6 | 4 | 5 | 0 | 0 | 0 |
| Foaming agent (DPT *4) | 0 | 0 | 0 | 0 | 0 | 0 | 0 | 3 | 4 | 5 |
| Foaming assistant (sodium benzenesulfinate) | 4 | 3 | 0.8 | 1 | 1.2 | 2.5 | 2.0 | 0 | 0 | 0 |
| Foaming assistant (urea) | 0 | 0 | 0 | 0 | 0 | 0.5 | 0.4 | 1.2 | 1.6 | 2 |
| Content of closed cells (%) | 25 | 25 | 20 | 25 | 30 | 25 | 25 | 20 | 25 | 30 |
| Mean size of closed cells ($\mu$m) | 60 | 85 | 108 | 110 | 110 | 95 | 105 | 55 | 65 | 80 |

*1, *2, *3: same as in Table 1
*4: dinitrosopentamethylene tetraamine

TABLE 4

|  | Example 11 | Example 12 | Example 13 | Example 14 | Example 15 | Example 16 | Example 17 | Comparative Example 11 | Comparative Example 12 | Comparative Example 13 |
|---|---|---|---|---|---|---|---|---|---|---|
| Wear resistance property | 100 | 106 | 117 | 112 | 105 | 106 | 108 | 104 | 100 | 95 |
| Performance on icy roads | 100 | 103 | 97 | 103 | 110 | 103 | 103 | 100 | 100 | 107 |

Examples 11, 12 and 14 are examples of changing the mean size of the closed cells while maintaining the closed cell content and Examples 16 and 17 are examples of using sodium benzenesulfinate together with urea. Examples 13, 14 and 15 have the same ratio of the foaming agent to the foaming assistant, and in Example 14 the well balanced performance of tire for the passenger car can be obtained.

TABLE 5(a)

(compounding unit: part by weight)

| | Example 21 | Example 22 | Example 23 | Example 24 | Example 25 | Example 26 | Example 27 | Comparative Example 21 | Comparative Example 22 |
|---|---|---|---|---|---|---|---|---|---|
| Natural rubber | 70 | 70 | 70 | 70 | 70 | 70 | 70 | 70 | 70 |
| Butadiene rubber | 30 | 30 | 30 | 30 | 30 | 30 | 30 | 30 | 30 |
| Carbon black (SAF) | 60 | 60 | 60 | 60 | 60 | 60 | 60 | 60 | 60 |
| Stearic acid | 3 | 3 | 3 | 3 | 3 | 3 | 3 | 3 | 3 |
| Zinc oxide | 3 | 3 | 3 | 3 | 3 | 3 | 3 | 3 | 3 |
| Wax | 1 | 1 | 1 | 1 | 1 | 1 | 1 | 1 | 1 |
| Antioxidant *1 | 1 | 1 | 1 | 1 | 1 | 1 | 1 | 1 | 1 |
| Antioxidant *2 | 0.2 | 0.2 | 0.2 | 0.2 | 0.2 | 0.2 | 0.2 | 0.2 | 0.2 |
| Vulcanization accelerator *3 | 1 | 1 | 1 | 1 | 1 | 1 | 1 | 1 | 1 |
| Sulfur | 1 | 1 | 1 | 1 | 1 | 1 | 1 | 1 | 1 |
| Foaming agent (azodicarbonamide) | 4 | 4.5 | 4 | 5 | 6 | 4.5 | 5 | 0 | 4 |
| Foaming agent (DPT *4) | 0 | 0 | 0 | 0 | 0 | 0 | 0 | 0 | 0 |
| Foaming assistant (sodium benzenesulfinate) | 2 | 1 | 0.48 | 0.6 | 0.72 | 0.8 | 0.6 | 0 | 0 |
| Foaming assistant (urea) | 0 | 0 | 0 | 0 | 0 | 0.4 | 0.3 | 1 | 3 |
| Non-melted short fibers | 0 | 0 | 0 | 0 | 0 | 0 | 0 | 0 | 0 |
| Melted short fibers | 0 | 0 | 0 | 0 | 0 | 0 | 0 | 0 | 0 |
| Content of closed cells (%) | 20 | 20 | 12 | 20 | 28 | 20 | 20 | 20 | 20 |
| Mean size of spheric closed cells ($\mu$m) | 100 | 150 | 200 | 200 | 210 | 150 | 170 | 60 | 80 |

*1, *2, *3: same as in Table 1
*4: same as in Table 3

TABLE 5(b)

(compounding unit: part by weight)

| | Comparative Example 23 | Example 28 | Example 29 | Example 30 | Example 31 | Comparative Example 24 | Comparative Example 25 | Comparative Example 26 | Comparative Example 27 |
|---|---|---|---|---|---|---|---|---|---|
| Natural rubber | 70 | 70 | 70 | 70 | 70 | 70 | 70 | 70 | 70 |
| Butadiene rubber | 30 | 30 | 30 | 30 | 30 | 30 | 30 | 30 | 30 |
| Carbon black (SAF) | 60 | 60 | 60 | 60 | 60 | 60 | 60 | 60 | 60 |
| Stearic acid | 3 | 3 | 3 | 3 | 3 | 3 | 3 | 3 | 3 |
| Zinc oxide | 3 | 3 | 3 | 3 | 3 | 3 | 3 | 3 | 3 |
| Wax | 1 | 1 | 1 | 1 | 1 | 1 | 1 | 1 | 1 |
| Antioxidant *1 | 1 | 1 | 1 | 1 | 1 | 1 | 1 | 1 | 1 |
| Antioxidant *2 | 0.2 | 0.2 | 0.2 | 0.2 | 0.2 | 0.2 | 0.2 | 0.2 | 0.2 |
| Vulcanization accelerator *3 | 1 | 1 | 1 | 1 | 1 | 1 | 1 | 1 | 1 |
| Sulfur | 1 | 1 | 1 | 1 | 1 | 1 | 1 | 1 | 1 |
| Foaming agent (azodicarbonamide) | 5 | 4 | 5 | 4 | 5 | 4 | 5 | 4 | 5 |
| Foaming agent (DPT *4) | 0 | 0 | 0 | 0 | 0 | 0 | 0 | 0 | 0 |
| Foaming assistant (sodium benzenesulfinate) | 0 | 2 | 0.6 | 2 | 0.6 | 0 | 0 | 0 | 0 |
| Foaming assistant (urea) | 3.7 | 0 | 0 | 0 | 0 | 3 | 3.7 | 3 | 3.7 |
| Non-melted short fibers | 0 | 4 | 4 | 0 | 0 | 4 | 4 | 0 | 0 |
| Melted short fibers | 0 | 0 | 0 | 2 | 2 | 0 | 0 | 2 | 2 |
| Content of closed cells (%) | 28 | 20 | 20 | 22 | 22 | 20 | 28 | 22 | 30 |
| Mean size of spheric closed cells ($\mu$m) | 95 | 100 | 200 | 110 | 210 | 80 | 95 | 85 | 100 |

*1, *2, *3: same as in Table 1
*4: same as in Table 3

TABLE 6

| | Example 21 | Example 22 | Example 23 | Example 24 | Example 25 | Example 26 | Example 27 | Comparative Example 21 | Comparative Example 22 | Comparative Example 23 |
|---|---|---|---|---|---|---|---|---|---|---|
| Wear resistance property | 103 | 111 | 116 | 114 | 100 | 110 | 113 | 94 | 100 | 98 |
| Performance on ice roads | 102 | 103 | 94 | 104 | 116 | 101 | 102 | 100 | 100 | 107 |

| | Example 28 | Example 29 | Example 30 | Example 31 | Comparative Example 24 | Comparative Example 25 | Comparative Example 26 | Comparative Example 27 |
|---|---|---|---|---|---|---|---|---|
| Wear resistance property | 103 | 114 | 103 | 114 | 100 | 98 | 95 | 90 |
| Performance on ice roads | 102 | 104 | 105 | 105 | 103 | 107 | 104 | 107 |

Examples 21, 22 and 24 have the same closed cell content and different mean sizes of the closed cells. Examples 26 and 27 use sodium benzenesulfinate together with urea. Examples 23, 24 and 25 have the same ratio of the foaming agent to the foaming assistant, and also in Example 24 the well balanced performance of the heavy duty tire can be obtained.

Examples 28 and 29 are compounded with the non-melting short fibers and Examples 30 and 31 are compounded with the melting short fibers, and in these examples the mean size of the closed cells can be changed at the constant closed cell content. Further, the tire performance can be improved.

As explained above, since the formed rubber composition used in the present invention can be controlled in the closed cell content and the closed cell size separately, so that both of the wear resistance property and the performance on icy roads of the pneumatic tire comprising the tread made of the foamed rubber composition can be improved.

What is claimed is:

1. A pneumatic tire comprising a tread at least a ground contacting portion of which is made of a foamed rubber composition, which comprises matrix rubber comprising at least one rubber ingredient selected from the group consisting of natural rubber and synthetic rubber and closed cells formed by compounding a foaming agent and a foaming assistant which comprises sodium benzenesulfinate or a combination of sodium benzenesulfinate and urea and being vulcanized.

2. A pneumatic tire according to claim 1, wherein the foamed rubber composition further comprises short fibers in the matrix rubber.

3. A pneumatic tire according to claim 1, wherein the foamed rubber composition further comprises a filler.

4. A pneumatic tire according to claim 1, wherein the foamed rubber composition further comprises a filler and short fibers.

5. A pneumatic tire according to claim 1, wherein the closed cells at least one part of which is covered with a coat layer made from a short fiber material.

6. A pneumatic tire according to claim 2 or 4, wherein the short fibers are solid and/or hollow.

7. A pneumatic tire according to claim 1, wherein the foaming agent comprises azodicarbonamide.

8. A pneumatic tire according to claim 1, wherein the foaming agent is compounded in an amount of 1–20 parts by weight based on 100 parts by weight of the rubber ingredient and the foaming assistant is compounded in an amount of 15–200% by weight based on the amount of foaming agent compounded.

9. A pneumatic tire according to claim 1, wherein a content of the closed cells is of 1–100%.

10. A pneumatic tire according to claim 1, wherein a mean size of the closed cells is of 30–200 μm.

11. A pneumatic tire comprising a tread at least a ground contacting portion of which is made of a foamed rubber composition, which comprises a rubber ingredient selected from the group of natural rubber and synthetic rubbers, a foaming agent, and a foaming assistant comprising sodium benzenesulfinate.

12. A pneumatic tire according to the claim 11, wherein the foaming assistant further comprises urea.

13. A pneumatic tire according to claim 11, wherein the pneumatic tire can be used for a passenger car and as a filler at least one selected from the group consisting of carbon black and silica is compounded in the foaming rubber composition in 30–80 parts by weight based 100 parts by weight of the rubber ingredient.

14. A pneumatic tire according to claim 11, wherein the pneumatic tire can be used as a heavy duty pneumatic tire and as the rubber ingredient natural rubber is compounded in not less than 50% by weight and as a filler carbon black is compounded in 30–80 parts by weight based on 100 parts by weight of the rubber ingredient, in the foaming rubber composition.

* * * * *